United States Patent Office 3,298,923
Patented Jan. 17, 1967

3,298,923
METHOD FOR PRODUCING PURINE
DERIVATIVES
Isao Banno, Teiji Iijima, and Takezi Hasegawa, Toyonaka, Seizi Igarasi, Ashiya, Akira Imada, Nishinomiya, Ikuo Nogami, Suita, Ikuo Suhara and Masahiko Yoneda, Nishinomiya, and Einosuke Ohmura, Suita, Japan, assignors to Takeda Chemical Industries, Ltd., Osaka, Japan
No Drawing. Filed Aug. 7, 1963, Ser. No. 300,672
Claims priority, application Japan, Aug. 8, 1962, 37/34,286
14 Claims. (Cl. 195—28)

This invention relates to a method for producing purine derivatives. More precisely, the invention relates to a novel method for producing purine derivatives of the formula:

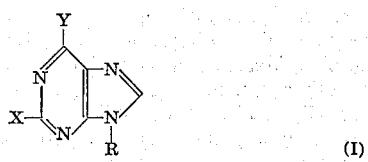

wherein X stands for —H, —OH or —$NH_2$, Y stands for —OH or —$NH_2$ but not —$NH_2$ when X is —OH or —$NH_2$, and R stands for

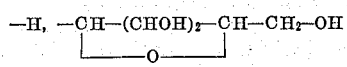

or

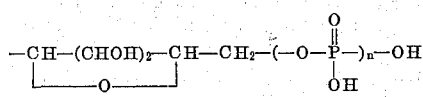

where $n$ is an integer from 1 to 3 inclusive, by the use of microorganisms, particularly microorganisms having properties to be detailed hereinafter.

These purine derivatives nclude, for example, hypoxanthine, xanthine, adenine, guanine inosine, xanthosine, adenosine, guanosine, and 5'-nucleotides derived therefrom such as 5'-inosinic acid (IMP), 5'-xanthylic acid (XMP), 5'-adenylic acid (AMP), 5'-guanylic acid (GMP), adenosine 5'-diphosphate (ADP) and adenosine 5'-triphosphate (ATP). It is a well-known fact that said purine derivatives are useful and valuable as medicines, chemicals or food-additives.

Such purine derivatives are synthesized in vivo, e.g. in cells of microorganisms, and are retained therein as components of nucleic acids. A biochemical pathway of these purine derivatives to nucleic acids is thought to be that 5-aminoimidazole ribotide is converted to 5'-inosinic acid via 5-amino-imidazole 4-carboxamide ribotide, and inosinic acid to 5'-adenylic acid and 5'-guanylic acid, and finally the last two 5'-nucleotides are incorporated together with 5'-pyrimidine-nucleotides such as 5'-uridylic acid and 5'-cytidylic acid to form nucleic acids. Since nucleic acids are essential to organisms' life and are always produced in cells, said purine-nucleotides should exist therein in the form of intermediates. Nevertheless, it is widely known that natural strains of microorganisms contain but a small amount of these purine derivatives in the form of purine bases, nucleosides or nucleotides, and that these purine derivatives hardly come out of the cells.

On the other hand, it is also known that some nutritional mutants accumulate hypoxanthine derivatives extracellularly. However, the use of such nutritional mutants to produce hypoxanthine derivatives is not suitable for industrial application, because incubation of such mutants involves troublesome and impractical procedures and adjustment of conditions, for example, addition of the required nutritious substances.

The present invention is based upon the observation that microorganisms which are resistant to antimetabolites in purine metabolism accumulate a recoverable amount of purine derivatives in a culture medium under simple incubation conditions. As a result, it was found that such microorganisms have the ability and are usable for the purpose of producing purine derivatives industrially; moreover, it was found that these desired microorganisms are obtainable as mutants induced artificially or spontaneously from those naturally existing strains whose growth is inhibited by the presence of an antimetabolite in purine metabolism.

The principal object of the present invention is therefore to embody a novel method for producing said purine derivatives of Formula I, supra, with ease in operation by the use of a mutant which, as aforesaid, is resistant to an antimetabolite in purine metabolism. It is another but accompanying object of the invention to provide those useful purine derivatives more cheaply in the industrial production of the same, than has hitherto been possible.

Said objects are, briefly stated, realized by incubating in a suitable culture medium a mutant which is resistant to an antimetabolite in purine metabolism.

Original microorganisms from which the desired mutants are inducible are those strains whose growth is inhibited by the presence of an antimetabolite in purine metabolism, and which may be cited hereinafter as "wild type strain(s)" in contrast with the "mutant(s)" used in the process of this invention. The wild type strains may include any of those isolated from our environment and those mutants which are resistant to substances other than the antimetabolites in purine metabolism or which show a nutritional requirement. These wild type strains are distributed widely among microorganisms belonging to so-called bacteria, actinomycetes and yeast. The desired mutation is always inducible on the said wild type strains.

That is to say, the wild type strains are inhibited in their growth in the presence of an antimetabolite in purine metabolism, the antimetabolites including, for example, 8-azaguanine, 6-mercaptopurine, 2,6-diaminopurine, benzimidazole, caffeine, purine riboside, 8-azaguanine riboside 5'-phosphate and 6-mercaptopurine riboside 5'-phosphate. However, the mutants which are resistant to said antimetabolites can be obtained by treating a wild type strain with a mutagen such as irradiation by ultraviolet rays, irradiation by X-ray or contact with nitrous acid, or by selecting and isolating a colony of a naturally and spontaneously occurring mutants from among colonies of the wild type strain. The mutants thus obtained are not inhibited in their growth by said antimetabolites in purine metabolism any more. These means for inducing the desired mutation on a wild type strain may be effected in any of the ways per se well known for this purpose by those skilled in the art and which have been described in many publications, for example, "Methods in Medical Research," volume 3, edited by R. W. Gerard, published by the Year Book Publishers, Inc., Chicago, U.S.A., in 1950; and "Nature," volume 183, page 1829 (1959), report by F. Kaudewitz.

The wild type strains exist widely and independently of the classification of microorganisms, and include, for example, the following microorganisms:

TABLE 1

Endomyces magnusii Ludwig;
Endomycopsis fibuliger (Lindner) Dekker;
Endomycopsis scolyti Phaff and Yoneyama;
Schizosaccharomyces pombe Lindner;
Saccharomyces cerevisiae Hansen;
Saccharomyces rouxii Boutroux;
Saccharomyces delbrueckii Lindner;

TABLE 1—Continued

*Saccharomyces marxianus* Hansen;
*Torulaspora delbrueckii* Lindner;
*Torulaspora rosei* Guilliermond;
*Debaryomyces hansenii* (Zopf) Lodder et Van Rij;
*Debaryomyces kloeckeri* Guilliermond et Péju;
*Pichia membranaefaciens* Hansen;
*Pichia mogii* Ohara et Nonomura;
*Pichia sake* (Naganishi) Ohara et Nonomura;
*Saccharomycodes ludwigii* Hansen;
*Ashbya gossypii* (Ashby et Nowel) Guilliermond;
*Wickerhamia fluorescens* Soneda;
*Petasospora rhodaensis* (Ramirez et Boidin) Boidin et Abadie;
*Sporobolomyces roseus* Kluyver et Van Niel;
*Sporobolomyces salmonicolor* (Fischer et Brebeck) Kluyver et Van Niel;
*Bullera alba* (Nanna) Derx;
*Cryptococcus albidus* (Saito) Skinner;
*Cryptococcus laurentii* (Kufferath) Skinner;
*Torulopsis sake* (Saito et Oda) Lodder et Van Rij;
*Torulopsis glabrata* (Anderson) Lodder et De Vries;
*Brettanomyces anomalus* Custers;
*Brettanomyces bruxellensis* Kuff;
*Trichosporon cutaneum* (De Beurm., Gougerot et Vaucher) Ōta;
*Trichosporon pullulans* (Lindner) Diddens et Lodder;
*Mycoderma mandchurica* Saito;
*Candida mycoderma* (Reese) Lodder et Van Rij;
*Kloeckera apiculata* (Reese emend. Klöcker) Junke;
*Kloeckera africana* (Klöcker) Junke;
*Rhodotorula glutinis* (Fres.) Harrison;
*Rhodotorula rubra* (Bemme) Lodder;
*Kluyveromyces polysporus* v.d. Walt;
*Bacillus megaterium* De Bary;
*Bacillus subtilis* Cohn emend. Prazmowski;
*Bacillus cereus* Frankland and Frankland;
*Bacillus firmus* Werner;
*Bacillus polymixa* (Prazmowski) Migula;
*Sarcina lutea* Schroeter; and
*Escherichia coli* (Migula) Castellani et Chalmers.

These microorganisms are endowed with the properties of accumulating the objective purine derivatives in their environment when changed into their mutants which are resistant to antimetabolites in purine metabolism.

Incubation of the mutant is carried out in a suitable culture medium. The culture medium may be liquid or solid, but liquid culture medium is more preferable for production on an industrial scale. When the culture medium is liquid, the incubation is carried out either stationarily or in the manner of a submerged process under aeration and/or agitation. The culture medium should contain assimilable carbon sources and utilizable nitrogen sources for the mutant used, and it is desirable that it be supplemented with inorganic salts or trace elements. The nutrients usable for the incubation are those generally employed for the incubation of microorganisms. Thus, the carbon sources include, for example, starch, dextrin, sucrose, lactose, maltose, glucose, and glycerol; the nitrogen sources contain, for example, meat extracts, peptone, yeast extracts, yeast, soybean meal, cornsteep liquor, molasses and organic or inorganic nitrogen compounds such as urea, ammonium salts—e.g. ammonium chloride, ammonium sulfate, ammonium nitrate, ammonium lactate—and nitrates—e.g. sodium nitrate or potassium nitrate. Other inorganic salts may, for example, be potassium phosphate, magnesium sulfate, sodium chloride and calcium chloride. Traces of such nutritional elements as boric acid, copper sulfate, potassium iodide, ferric chloride, manganous sulfate, sodium molybdate and zinc sulfate may be used. As other trace elements, vitamins are preferably added to the medium, and they include, for example, biotin, pantothenic acid, folic acid, inositol, nicotinic acid, paraaminobenzoic acid, pyridoxine, riboflavine, thiamine and their salts (in those cases where salts exist).

The conditions under which the mutant is incubated is advantageously correlated to the species of the strain used and/or constitution of the culture medium. Usually, the initial pH of culture medium falls within the range between weakly acid and weakly alkaline, and the temperature for incubation is selected from the range within which the mutant can grow or propagate favorably, the range being in most cases from 20° C. to 40° C. These conditions are preferably also correlated to other factors contributing to the growth of microorganisms, so as to make the yield of the desired purine derivatives maximum.

As the incubation proceeds, the purine derivatives are formed and accumulated in the culture medium. The purine derivatives thus extracellularly accumulated may be 5′-purine-nucleotides or purine-nucleosides or purine bases. In some cases, more than one of a purine base, a nucleoside and a 5′-nucleoside may accumulate in the culture medium. Thus the purine derivatives produced may be only the hypoxanthine derivatives such as hypoxanthine, inosine and 5′-inosinic acid, or they may be accumulated concomitantly with adenine, adenosine and 5′-adenylic acid. No correlation has been observed between the kind of purine derivatives thus accumulated on the one hand and the position of the wild strain in the classification of microorganisms or the kind of means employed for inducing the mutation on the wild type strain, on the other hand. Therefore, it is preferable, in each case, to select a mutant that can accumulate the desired purine derivative or derivatives in the medium, exclusively or predominantly.

In practice, it is desirable to effect the incubation while determining whether or not a sufficient amount of desired purine derivatives has been accumulated in the culture broth. The time when the maximum amount of purine derivatives is accumulated is variable depending upon factors such as the strains or species of resistant mutant used, the kinds or constitutions of nutrients in the culture medium, the incubation temperatures, the extent of aeration and/or agitation, and the apparatus for the incubation. In most cases, however, the maximum accumulation of purine derivatives is observed after 1 to 15 days from the start of incubation. More specifically, it has been observed that bacteria tend to accumulate a maximum of purine derivatives within a rather short time (about 1 to 7 days), followed by actinomycetes (about 3 to 8 days), while yeasts require a longer period (about 7 to 12 days) for their maximum accumulation of the purine derivatives, though there are of course exceptions.

For determining the amount of purine derivatives being accumulated in the medium, any of the per se known means of determination of these compounds is applicable. For example, paper electrophoresis, paper partition chromatography, column chromatography on ion-exchange resins, enzymic determination or measurement of absorbance at the wave lengths of 260, 250 and 280 millimicrons may be utilized for the said purpose. A means of microbioassay wherein a varient requiring the purine derivatives for its own growth as an essential factor can be applied for the same purpose. Details of these determination techniques have been described in many publications, for example, "The Nucleic Acids" volume 1, edited by Chargaff and Davidson, published by Academic Press, Inc., New York in 1955; "Journal of Biological Chemistry," volume 167, pages 429, 445 and 461, report by Kalkar (1947); and "ibid," volume 209, page 23, report by R. B. Hurlbert et. al. (1954).

Some mutants employed for the method of this invention produce so-called phosphomonoesterase which takes a role of catalyzing conversion of nucleotides into nucleosides. When the purpose in view is directed especially to the production of nucleotides, the use of a mutant producing phosphomonoesterase will result in lowered yield of the desired nucleotides. In such a case, it is desirable to add to the culture medium a suitable phosphomonoesterase inhibitor. The phosphomonoesterase inhibitors usable for such purpose includes, for example, phosphates—such as sodium phosphates and potassium phosphates—arsenates—such as sodium arsenates and potassium arsenates—fluorides—such as sodium fluoride and potassium fluoride, cysteine, glutamic acid, ethlyenediaminetetracetic acid (EDTA), and divalent metal ions—such as zinc ion and cupric ion. By the addition of one or more of said phosphomonoesterase inhibitors in an amount which does not disturb the growth of the mutant used, the activity of phosphomonoesterase is sufficiently inhibited, which results in increased yield of nucleotides, while the accumulation of nucleosides is lessened.

The objective purine derivatives thus accumulated in the culture medium are recovered as a mixture thereof or are isolated as the respective compounds. Means for recovery or isolation of desired purine derivatives are carried out after any of per se known means for separating fermentation products from culture broth or for separating a plurality of similar chemical compounds into the individual compounds. For example, the separation can be effected by utilizing a difference in the solubilities in various solvents between the objective compounds and the impurities, the difference in their distribution coefficients between the two solvent layers, the difference in their adsorbabilities on an adsorbent such as active charcoal and ion-exchange resins, the difference in their dialyzabilities through a semi-permeable membrane, or the difference in their crystallizabilities from a solvent, as well as filtration or centrifugation of the culture broth with or without addition of a filter aid. In practice, these means for separation or isolation are carried out in combination or repeatedly according to the desired purity and state of the products. Thus, the purine derivatives are obtained in the form of free base or free acid or desired salt. Especially when the objective compounds are nucleotides, they may be preferably isolated in the form of salt formed with an inorganic or organic base such as barium salt, sodium salt, potassium salt, ammonium salt and basic amino acid salt. Details of such separation or isolation means of the purine derivatives have already been described in many publications, for example, "The Nucleic Acids," volume 1, cited hereinabove; "Methods in Enzymology," volume 3, edited by Colowick and Kaplan, published by Academic Press, Inc., U.S.A. in 1957; "Archives of Biochemistry and Biophysics," volume 81, page 223 (1959), report by Tsuboi and Price; "Journal of Biological Chemistry," volume 209, page 23 (1954); and French Patent Nos. 1,303,206 and 1,303,546.

The invention will now be described in further particularity by means of the following examples. It will be understood, of course, that the invention is not limited to the particular details of these examples since they only set forth presently exemplary embodiments of the invention. In these examples, the percentages with regard to the compositions of media are on the weight per volume basis. The abbreviations "mg.," "γ." "ml.," "mg. %" and "γ%" means respectively milligram(s), gamma(s), milliliter(s), milligram percent, and gamma percent. Respective mutants employed in these examples have been deposited with American Type Culture Collection, Washington, D.C., U.S.A., bearing the respective accession numbers abbreviated as "ATCC-numbers."

*Example 1*

Cells of *Saccharomyces cerevisiae* Hansen are spread on an agar plate containing 100 γ/ml. of 8-azaguanine, and spontaneously occurring mutants resistant to 8-azaguanine are isolated. From the mutants thus isolated, a strain (designated as MAGR–16 by the present inventors; ATCC No. 15119) is inoculated into 1 liter of an aqueous culture medium containing nutrients as mentioned below, and the culture is incubated for 11 days at 28° C. under aeration and agitation. The broth is filtered. The filtered broth is treated with a column of active charcoal to adsorb the objective purine derivatives and the column is eluted with ammoniacal ethanol to obtain fractions containing purine derivatives. The fractions are treated with a quaternary strong base styrene-type anion exchange resin (ionic capacity 1.1 equivalents per liter) to obtain 285 mg. of hypoxanthine, 168 mg. of inosine and 40 mg. of 5'-inosinic acid.

Constitution of the culture medium:

| | Percent |
|---|---|
| Glucose | 5 |
| Ammonium citrate | 0.85 |
| Potassium dihydrogen phosphate | 0.1 |
| Magnesium sulfate | 0.05 |
| Sodium chloride | 0.01 |
| Calcium chloride | 0.01 |
| Biotin | 20γ |
| Thiamine hydrochloride | 4γ |
| Pyridoxine hydrochloride | 4γ |
| Inositol | 20γ |
| Calcium pantothenate | 4γ |
| Riboflavine | 4γ |
| Nicotinic acid | 4γ |
| Para-aminobenzoic acid | 4γ |
| Boric acid | Trace |
| Copper sulfate | Trace |
| Potassium iodide | Trace |
| Ferric chloride | Trace |
| Zinc sulfate | Trace |

The aqueous solution of the above-mentioned nutrients shows a pH of 5.5 and is used after sterilization for 15 minutes under pressure of 15 pounds per square inch.

The exchange resin technique for separating the products may be replaced by any of the other hereinbefore-disclosed techniques, for instance, adsorption chromatography on active charcoal wherein ammoniacal ethanol is used for the elution, or fractionation by cellulose powder column.

The method of isolating the mutants resistant to 8-azaguanine, and the method of selecting the desired strain from these resistant mutants, are set forth at the end of the present specification. These same methods can be applied for effecting the said isolations and selections in all the following examples.

*Example 2*

Cells of *Saccharomyces cerevisiae* Hansen are allowed to contact with nitrite ions and are then spread on the surface of an agar plate containing 100 γ/ml. of 8-azaguanine to obtain some colonies of 8-azaguanine-resistant mutants. From these, a strain (designated as MAGR–3397 by the present inventors; ATCC No. 15120) is selected and cultivated after the manner set forth in Example 1 in an aqueous culture medium of the same constitution and under the same conditions as in Example 1, whereupon 230 mg. of hypoxanthine, 185 mg. of inosine and 22 mg. of 5'-inosinic acid are obtained per liter of the culture broth.

*Example 3*

Cells of *Saccharomyces cerevisiae* Hansen are exposed to irradiation by ultraviolet rays, and surviving cells are spread on the surface of an agar plate containing 100 γ/ml. of 8-azaguanine. From the resulting colonies of 8-azaguanine-resistant mutants, a strain (designated as MAGR–3118 by the present inventors; ATCC No. 15121) is selected and cultivated in an aqueous culture medium of the same constitution and under the same conditions as in Example 1 except that the incubation is continued for 2 days. The same treatment on the culture broth as in Example 1 yields 100 mg. of hypoxanthine, 120 mg. of inosine and 20 mg. of 5'-inosinic acid per liter of the culture broth.

Example 4

The mutant MAGR-3118 used in Example 3 is inoculated into an aqueous culture medium containing nutrients as mentioned below, and the culture is incubated for 12 days at 28° C. in a rotary shaker. The same treatment on the cuture broth as in Example 1 yields 148 mg. of hypoxanthine and 156 mg. of inosine per liter of the culture broth.

Constitution of the culture medium:

| | Percent |
|---|---|
| Peptone | 0.5 |
| Yeast extract | 0.2 |
| Glucose | 5 |

The aqueous solution containing said nutrients has a pH of 6.0.

Example 5

In the same manner as in Example 2, some colonies of 8-azaguanine-resistant mutants are obtained from the wild type strain of *Saccharomyces cerevisiae* Hansen. From these, a strain (designated as MAGR-56 by the present inventors; ATCC No. 15122) is selected and inoculated into an aqueous culture medium of the same constitution as in Example 1. The incubation and treatment for recovery of products are carried out after the manner of Example 1, whereupon 164 mg. of hypoxanthine, 212 mg. of inosine and 54 mg. of adenine are obtained per liter of the culture broth.

Example 6

In the same manner as in Example 1, some colonies of 8-azaguanine-resistant mutants are spontaneously obtained from the wild type strain of *Saccharomyces oviformis* Osterwalder. From these, a strain (designated as MAGR-66 by the present inventors; ATCC No. 15123) is selected and inoculated into an aqueous culture medium of the same constitution as in Example 1. The incubation is carried out for 12 days under the same conditions as in Example 1. The same treatment on the culture broth as in Example 1 yields 146 mg. of hypoxanthine, 127 mg. of inosine, 10 mg. of 5'-inosinic acid, 55 mg. of adenosine and 45 mg. of 5'-adenylic acid per liter of the culture broth.

Example 7

In the same manner as in Example 3, some colonies of 8-azaguanine-resistant mutants are obtained from the wild strain of *Rhodotorula rubra* (Bemme) Lodder. From these, a strain (designated as RMAGR-9 by the present inventors; ATCC No. 15124) is selected and inoculated into an aqueous culture medium of the same constitution as in Example 1. The incubation is carried out for 10 days under the same conditions as in Example 1. Subsequent treatment on the culture broth gives 6 mg. of hypoxanthine, 35 mg. of inosine, 30 mg. of 5'-inosinic acid and 40 mg. of adenosine per liter of the culture broth.

Example 8

In the same manner as in Example 1, some colonies of spontaneous mutants resistant to 8-azaguanine are obtained from *Rhodotorula glutinis* (Fres.) Harrison. From these, a strain (designated as RMAGR-2 by the present inventors; ATCC No. 15125) is selected and inoculated into an aqueous culture medium of the same constitution as in Example 1. The incubation is carried out for 6 days under the same conditions as in Example 1. Subsequent treatment on the culture broth gives 8 mg. of hypoxanthine, 14 mg. of inosine, 12 mg. of 5'-inosinic acid and 32 mg. of 5'-adenylic acid per liter of the culture broth.

Example 9

In the same manner as in Example 3, the wild strain of *Torulopsis glabrata* (Anderson) Lodder et De Vries is exposed to irradiation by ultra-violet rays to obtain some mutants resistant to 8-azaguanine. From these, a strain (designated as TMAGR-23 by the present inventors; ATCC No. 15126) is selected and inoculated into an aqueous culture medium of the same constitution as in Example 1. The incubation is carried out for 10 days under the same conditions as in Example 1. Subsequent treatment on the culture broth as in Example 1 gives 250 mg. of inosine, 62 mg. of 5'inosinic acid and 112 mg. of adenosine per liter of the culture broth.

Example 10

Washed cells of *Bacillus megaterium* De Bary are exposed to ultra-violet rays, and then spread on the surface of an agar plate containing 50 γ/ml. of 8-azaguanine to obtain resistant mutants growing on the agar plate. From these, a strain (designated as KAG-72 by the present inventors; ATCC No. 15127) is selected and inoculated into an aqueous culture medium containing nutrients as mentioned below. The incubation is carried out for 5 days at 28° C. under aeration and agitation. The culture broth is centrifuged to remove solid substances. The liquid part is treated with active charcoal to adsorb the purine derivatives, and the charcoal is extracted with ammoniacal ethanol, followed by concentration of extracts to give a mixture of 5'-nucleotides. The mixture is subjected to a quaternary strong base styrene-type anion exchange resin (ionic capacity 1.1 equivalent per liter) chromatography to obtain 70 mg. of 5'-inosinic acid, 230 mg. of 5'-adenylic acid and 280 mg. of 5'-guanylic acid per liter of the culture broth.

Constitution of the culture medium:

| | Percent |
|---|---|
| Mannitol | 2 |
| Monosodium glutamate | 2 |
| Dipotassium hydrogen phosphate | 0.7 |
| Potassium dihydrogen phosphate | 0.2 |
| Magnesium sulfate | 0.02 |
| Ammonium sulfate | 0.1 |
| Powdery yeast extract | 0.1 |

Instead of using ion exchange resin for separating the nucleotides, any of the other hereinbefore-disclosed techniques may also be used for this purpose.

Example 11

While suspended in 0.2% aqueous solution of sodium chloride, washed cells of *Bacillus megaterium* De Bary are exposed to irradiation by ultraviolet rays. The cell suspension thus treated is spread over an agar plate containing 100 γ/ml. of 6-mercaptopurine to obtain some resistant mutants growing on the plate. From these, a strain (designated by the present inventors as KMP-221; ATCC No. 15128) is selected and inoculated into an aqueous culture medium of the same constitution as in Example 10. The incubation and the subsequent treatment are carried out in the same manner as in Example 10 to obtain 210 mg. of 5'-inosinic acid, 100 mg. of 5'-adenylic acid and 55 mg. of 5'-guanylic acid per liter of the culture broth.

Example 12

Ultraviolet rays are irradiated onto a suspension of growing cells of *Escherichia coli* (Migula) Castellani et Chalmers, whereupon 99.9% in number of the cells are killed. Surviving cells are spread over an agar plate containing 400 γ/ml. of 6-mercaptopurine to obtain some resistant mutants growing on the plate. From these, a strain (designated as 6E-6 by the present inventors; ATCC No. 15130) is selected and inoculated into an aqueous culture medium containing nutrients as mentioned below. The incubation is carried out for 7 days at 28° C. under shaking. Subsequent treatment on the culture broth as in Example 10 yields 58.6 mg. of hypoxanthine and 1170 mg. of inosine per liter of the culture broth.

Constitution of the culture medium:

| | Percent |
|---|---|
| Glucose | 1 |
| Casein hydrolyzate | 1 |
| Dipotassium hydrogen phosphate | 0.7 |
| Potassium dihydrogen phosphate | 0.2 |
| Magnesium sulfate | 0.02 |
| Ammonium sulfate | 0.05 |
| Sodium citrate | 0.05 |
| Thiamine hydrochloride | 2.0γ |
| Riboflavine | 2.0γ |
| Para-aminobenzoic acid | 0.1γ |
| Nicotinic acid | 4.0γ |
| Calcium pantothenate | 4.0γ |
| Pyridoxine hydrochloride | 2.0γ |
| Folic acid | 0.1γ |
| Inositol | 2.0γ |
| Biotin | 0.1γ |

Example 13

Ultraviolet rays are irradiated onto a suspension of spores of *Streptomyces sp.* strain No. 107 and surviving spores are spread over an agar plate containing 200 γ/ml. of 8-azaguanine to obtain some colonies of resistant mutants growing on the plate. From these, a strain (designated as 107–15 by the present inventors; ATCC No. 15131) is selected and inoculated into an aqueous culture medium containing nutrients as mentioned below. The incubation is carried out for 5 days at 28° C. under shaking. After the incubation, subsequent treatment on the culture broth as in Example 10 is carried out to yield 170 mg. of 5'-adenylic acid, 1000 mg. of adenosine 5'-diphosphate (ADP) and 90 mg. of adenosine 5'-triphosphate (ATP) per liter of the culture broth.

Constitution of the culture medium:

| | Percent |
|---|---|
| Glucose | 4 |
| Asparagine | 0.5 |
| Dipotassium hydrogen phosphate | 0.2 |
| Magnesium sulfate | 0.05 |
| Casein hydrolyzate | 0.1 |

Example 14

A mutant (designated as B–822 by the present inventors) obtained by irradiation of ultraviolet rays on the wild type strain of *Bacillus subtilis* Cohn emend. Prazmowski accumulates hypoxanthine and inosine when cultivated in a suitable culture medium.

Cells of the mutant B–822 are further exposed to irradiation by ultraviolet rays, and surviving cells are spread on an agar plate containing 2000 γ/ml. of 8-azaguanine and 10 γ/ml. of adenine to obtain some mutants strengthened in their resistance to 8-azaguanine. From these, a strain (designated as B–822–22 by the present inventors; ATCC No. 15129) is selected and inoculated into an aqueous culture medium containing nutrients as mentioned below. The incubation is carried out for 7 days at 37° C. under shaking. After the incubation, the subsequent treatment on the culture broth is carried out after the manner as in Example 10 to give 521 mg. of hypoxanthine and 1580 mg. of inosine per liter of the culture broth. The yield is observed to be fairly higher than that obtained by the use of the strain B–822.

Constitution of the culture medium:

| | Percent |
|---|---|
| Soluble starch | 10 |
| Meat extracts | 0.5 |
| Sodium citrate | 1.2 |
| Diammonium hydrogen phosphate | 2 |
| Sodium chloride | 1.2 |
| Magnesium sulfate | 0.05 |
| Calcium chloride | 0.015 |
| Ethyl alcohol | 1 |

The pH of the aqueous solution of said nutrients is 6.8.

*Isolation and selection of the mutants used.*—Cells of the microorganism are spread on the surface of the synthetic agar plate containing the correspondingly defined amount (in concentration) of the antimetabolite in purine metabolism. Unlike wild type cells which substantially do not propagate, mutant cells can propagate and form colonies on the surface of the agar plate during incubation for 4 to 10 days. These colonies, consisting of mutant cells resistant to the antimetabolite, are isolated from each other. Each of them is inoculated and incubated in the synthetic liquid medium under the conditions as described in each example. Optical densities in wave lengths of 260, 250 and 280 millimicrons of culture filtrants are measured at intervals to estimate the accumulation of the purine derivatives. Among these mutants, the strain giving a high optical density is selected to be used for the production as described.

Such mutation of microorganisms as acquiring resistance to an antimetabolite occurs spontaneously as shown in Examples 1, 6 and 8, though with very low frequency. However, as shown in other examples, it is advantageous to submit cells of the microorganism to a mutagenic treatment prior to the isolation, because the frequency of occurrence of mutation is far heightened.

By this treatment, the number of survival cells will be from 1 to 0.001 percent relative to the wild type cells submitted to the mutagenic treatment.

Having thus disclosed the invention, what is claimed is:

1. A method for producing a purine derivative of the formula:

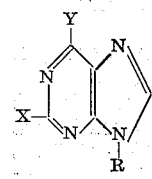

wherein X stands for a member selected from the group consisting of H, OH and $NH_2$, Y stands for a member selected from the group consisting of OH and $NH_2$, X being H when Y is $NH_2$, and R stands for a member selected from the group consisting of H,

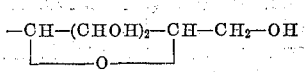

and

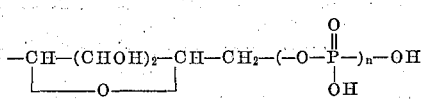

where $n$ is an integer from 1 to 3 inclusive, which comprises inoculating a microbial mutant which is resistant to an antimetabolite in purine metabolism and which is induced from a naturally existing strain, the growth of which in purine metabolism is inhibited by the presence of said antimetabolite, said antimetabolite being selected from the group consisting of 8-azaguanine and 6-mercaptopurine, into a culture medium containing assimilable carbon source and solely as growth factor, utilizable nitrogen source, incubating said culture whereupon said purine derivative is biosynthesized and accumulated in the culture broth, and recovering the purine derivative thus accumulated from the culture broth.

2. In a process for the production of purine of the formula:

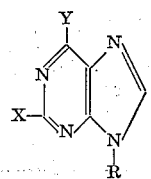

wherein X stands for a member selected from the group consisting of H, OH and $NH_2$, Y stands for a member selected from the group consisting of OH and $NH_2$, X being H when Y is $NH_2$, and R stands for a member selected from the group consisting of H,

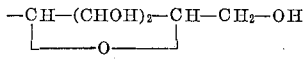

and

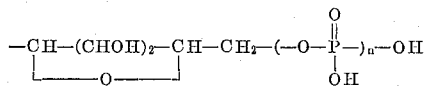

wherein $n$ is an integer from 1 to 3 inclusive, the improvement which consists in isolating a mutant strain which is resistant to growth-inhibiting action of an antimetabolite of purine metabolism and which is derived from a microorganism strain, the growth of which is inhibited by said antimetabolite, the latter being selected from the group consisting of 8-azaguanine and 6-mercaptopurine, culturing the said mutant strain in a nutrient medium therefor, and recovering the accumulated purine derivatives from the culture broth.

3. The improvement according to claim 2, wherein the mutant is a bacterium.

4. The improvement according to claim 2, wherein the mutant is a yeast.

5. The improvement according to claim 2, wherein the mutant is an actinomycete.

6. The improvement as claimed in claim 2, wherein the mutant is a member selected from the group consisting of mutant MAGR–16 (ATCC No. 15119), mutant MAGR–3397 (ATCC 15120), mutant MAGR–3118 (ATCC No. 15121), mutant MAGR–56 (ATCC No. 15122), mutant MAGR–66 (ATCC No. 15123), mutant RMAGR–9 (ATCC No. 15124), mutant RMAGR–2 (ATCC No. 15125), mutant TMAGR–23 (ATCC No. 15126), mutant KAG–72 (ATCC No. 15127), mutant KMP–221 (ATCC No. 15128), mutant B–822–22 (ATCC No. 15129), mutant 6E–6 (ATCC No. 15130) and mutant 107–15 (ATCC No. 15131).

7. The improvement according to claim 2, wherein the antimetabolite is 8-azaguanine.

8. The improvement according to claim 2, wherein the antimetabolite is 6-mercaptopurine.

9. The improvement according to claim 2, wherein the purine metabolism inhibitor resistant mutant is the mutant of a microorganism belonging to a member selected from the group consisting of the genera Endomyces, Endomycopsis, Schizosaccharomyces, Saccharomyces, Torulaspora, Debaryomyces, Pichia, Saccharomycodes, Ashbya, Wicherhamia, Petaspora, Sporoboromyces, Bullera, Cryptococcus, Torulopsis, Brettanomyces, Trichosporon, Mycoderma, Candida, Kloeckera, Rhodotorula, Klungveromyces, Bacillus, Sarcina and Escherichia.

10. A method for biosynthesizing a member selected from the group consisting of adenine, adenosine and adenosine 5′-phosphoric acid esters, which comprises inoculating a microbial mutant which is resistant to an antimetabolite in purine metabolism, the mutant being of a member selected from the group consisting of *Saccharomyces cerevisiae* Hansen, *Saccharomyces oviformis* Osterwalder, *Rhodotorula rubra* (Bemme) Lodder, *Rhodotorula glutinis* (Fres.) Harrison, *Torulopsis glabrata* (Anderson) Lodder et De Bries, *Bacillus megaterium* De Bary and *Streptomyces sp.* strain No. 107 (ATCC–15131), said mutant having been induced from a naturally existing strain of the corresponding microorganism, the growth of which in purine metabolism is inhibited by the presence of said antimetabolite, and said antimetabolite being selected from the group consisting of 8-azaguanine and 6-mercaptopurine, into a culture medium containing assimilable carbon source and, solely as growth factor, utilizable nitrogen source, incubating said culture at a temperature of from 20° C. to 40° C., whereupon said adenine compound is biosynthesized and accumulated in the culture medium, and recovering the adenine compound thus accumulated from the culture broth.

11. A method for biosynthesizing hypoxanthine, which comprises inoculating a microbial mutant which is resistant to an antimetabolite in purine metabolism, the mutant being of a member selected from the group consisting of *Saccharomyces cerevisiae* Hansen, *Saccharomyces oviformis* Osterwalder, *Rhodotorula rubra* (Bemme) Lodder, *Rhodotorula glutinis* (Fres.) Harrison, *Bacillus subtilis* Cohn emend. Prazmowski and *Escherichia coli* (Migula) Castellani et Chalmers, said mutant having been induced from a naturally existing strain of the corresponding microorganism, the growth of which in purine metabolism is inhibited by the presence of said antimetabolite, and said antimetabolite being selected from the group consisting of 8-azaguanine and 6-mercaptopurine, into a culture medium containing assimilable carbon source and, solely as growth factor, utilizable nitrogen source, incubating said culture at a temperature of from 20° C. to 40° C., whereupon hypoxanthine is biosynthesized and accumulated in the culture broth, and recovering hypoxanthine thus accumulated from the culture broth.

12. A method for biosynthesizing inosine, which comprises inoculating a microbial mutant which is resistant to an antimetabolite in purine metabolism, the mutant being of a member selected from the group consisting of *Saccharomyces cerevisiae* Hansen, *Saccharomyces oviformis* Osterwalder, *Rhodotorula rubra* (Bemme) Lodder, *Rhodotorula glutinis* (Fres.) Harrison, *Torulopsis glabrata* (Anderson) Lodder et De Vries, *Bacillus subtilis* Cohn emend. Prazmowski and *Escherichia coli* (Migula) Castellani et Chalmers, said mutant having been induced from a naturally existing strain of the corresponding microorganism, the growth of which in purine metabolism is inhibited by the presence of said antimetabolite, and said antimetabolite being selected from the group consisting of 8-azaguanine and 6-mercaptopurine, into a culture medium containing assimilable carbon source and, solely as growth factor, utilizable nitrogen source, incubating said culture at a temperature of from 20° C. to 40° C., whereupon inosine is biosynthesized and accumulated in the culture broth, and recovering inosine thus accumulated from the culture broth.

13. A method for biosynthesizing inosine 5′-phosphate, which comprises inoculating a microbial mutant which is resistant to an antimetabolite in purine metabolism, the mutant being of a member selected from the group consisting of *Saccharomyces cerevisiae* Hansen, *Saccharomyces oviformis* Osterwalder, *Rhodotorula rubra* (Bemme) Lodder, *Rhodotorula glutinis* (Fres.) Harrison, *Torulopsis glabrata* (Anderson) Lodder et De Vries and *Bacillus megaterium* De Bary, said mutant having been induced from a naturally existing strain of the corresponding microorganism, the growth of which in purine metabolism is inhibited by the presence of said antimetabolite, and said antimetabolite being selected from the group consisting of 8-azaguanine and 6-mercaptopurine, into a culture medium containing assimilable carbon source and, solely as growth factor, utilizable nitrogen source, incubating said culture at a temperature of from 20° C. to 40° C., whereupon inosine 5′-phosphate is biosynthesized and accumulated in the culture broth, and recovering inosine 5′-phosphate thus accumulated from the culture broth.

14. A method for biosynthesizing 5′-guanylic acid, which comprises inoculating a microbial mutant which is resistant in purine metabolism to an antimetabolite selected from the group consisting of 8-azaguanine and 6-mercaptopurine, the mutant being a mutant of *Bacillus megaterium* De Bary, into a culture medium containing assimilable carbon source and, solely as growth factor, utilizable nitrogen source, incubating said culture at a temperature of from 20° C. to 40° C., whereupon 5'-guanylic acid is biosynthesized and accumulated in the culture broth, and recovering the 5'-guanylic acid thus accumulated from the culture broth.

References Cited by the Examiner

UNITED STATES PATENTS

| | | | |
|---|---|---|---|
| 3,071,518 | 1/1963 | Scherr et al. | 195—78 |
| 3,135,666 | 6/1964 | Hara et al. | 195—28 |
| 3,139,385 | 6/1964 | Ogata et al. | 195—28 |

OTHER REFERENCES

Anderson et al.: Annual Review of Biochemistry, vol. 29, pages 589 to 601, 1960.

Levintow et al.: Annual Review of Biochemistry, vol. 30, page 618, 1961.

Okabayashi et al.: Chem. Pharm. Bull. (Japan), vol. 8, pages 370 to 372 (1960).

RAYMOND N. JONES, *Primary Examiner.*

A. LOUIS MONACELL, ALVIN E. TANENHOLTZ,
*Examiners.*